May 16, 1950  G. A. SMITH  2,507,938
COTTON ROLL HOLDER AND SALIVA EJECTOR
Filed Feb. 3, 1947
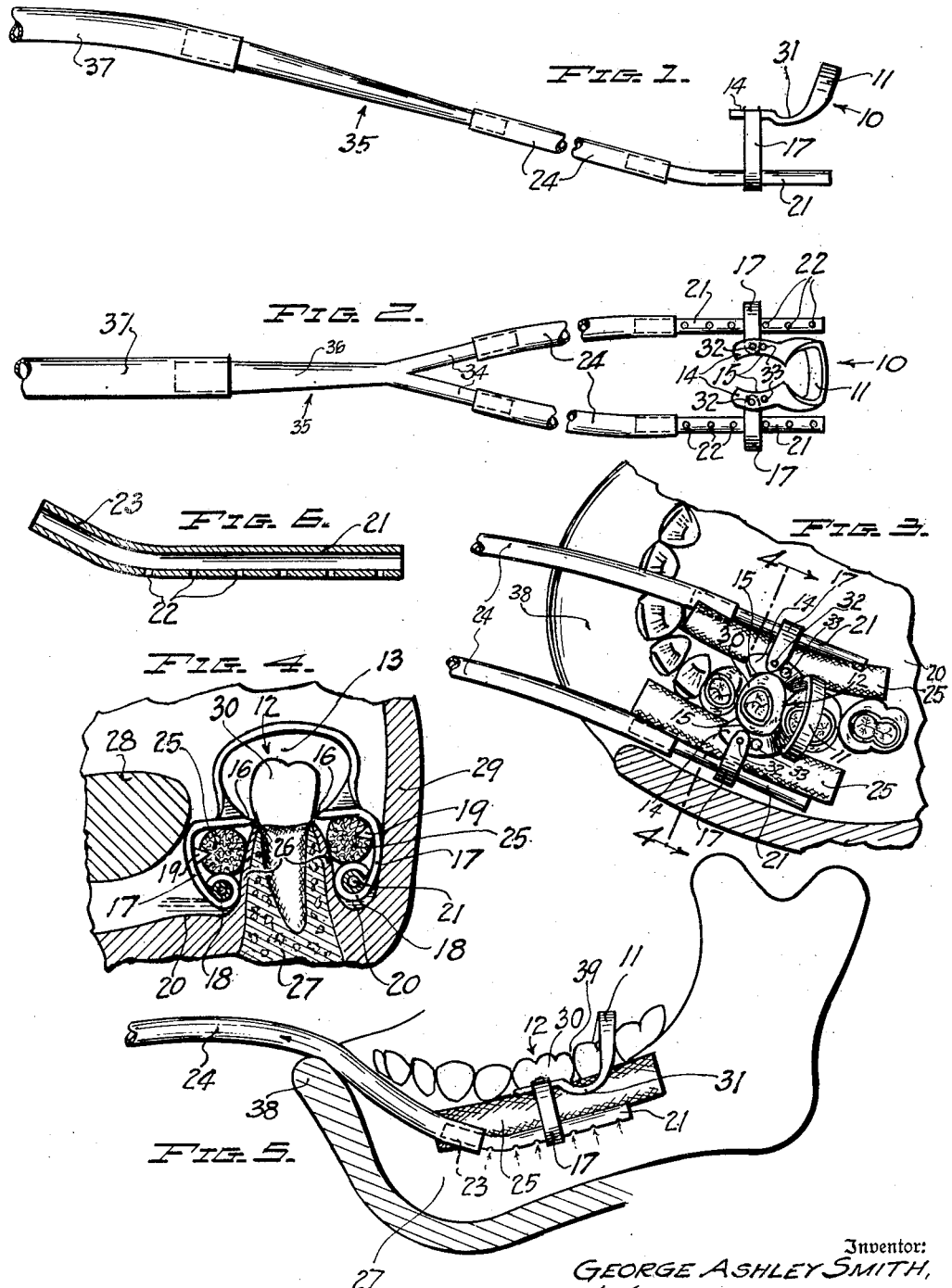
Inventor:
GEORGE ASHLEY SMITH,
Attorneys.

Patented May 16, 1950

2,507,938

UNITED STATES PATENT OFFICE 2,507,938

COTTON ROLL HOLDER AND SALIVA EJECTOR

George Ashley Smith, Salt Lake City, Utah

Application February 3, 1947, Serial No. 726,182

8 Claims. (Cl. 32—33)

This invention relates to a cotton roll holder and saliva ejector for dental and similar uses.

Among important objects of the invention are to provide a device that:

1. Prevents the accumulation of saliva during the performance of various kinds of dental work.
2. Is conducive to reduce discomfort of the patient to a minimum.
3. Gives the dental operator added working space in the restricted oral cavity of a patient, this feature having especial utility when filling teeth.
4. Economizes the time of the operator.
5. Is convenient, simple and relatively inexpensive.

According to the invention a clamp is securely fixed within the mouth of a dental patient, a tooth ordinarily providing an advantageous means of support. The clamp has branches that extend outwardly and downwardly on both sides of the gum tissues and each branch terminates in holding means for a perforated saliva tube that is disposed in suitable proximity to the floor of the mouth or to the roof of the mouth, as the case may be. Each saliva ejector tube is in operative communication with a waste conduit in which a suction is created, as usual, to draw the saliva through the intake perforations of the ejector and then into the waste conduit for suitable disposal in the usual manner. Thus, the recesses on both sides of the gum tissues are consistently drained of the saliva just as it tends to accumulate, without causing discomfort to the patient. At the same time, a cotton roll is securely held in position immediately above each saliva ejector tube so that the tooth upon which work is being done is kept substantially free of the flow of saliva.

Other important features and objects will become evident as the following description progresses.

In the accompanying drawing,

Fig. 1 represents a side elevation of the novel device in a typical position such as it occupies in use;

Fig. 2, a bottom plan corresponding to Fig. 1;

Fig. 3, a fragmentary occlusal view showing the device in place ready for use in the mandible or lower jaw of a patient;

Fig. 4, a vertical section taken on the line 4—4 in Fig. 3;

Fig. 5, a side elevation corresponding to Fig. 3, the lower jawbone being exposed; and, Fig. 6, a minor detail.

Referring to the drawing, the numeral 10 indicates a clamp made, for example, of spring metal and preferably of stainless steel. In this instance the clamp comprises an arched upper member 11 that is located above a tooth 12 being worked upon, the arch preferably defining a space 13 between the upper surfaces of the teeth and the clamp. At the lower extremities of the clamp 11 are inwardly projecting grippers 14 that are mutually opposed, as indicated in Fig. 4, so as to engage the tooth 12 somewhat in the manner shown. For this purpose the grippers 14 are preferably curved, as indicated at 15, Figs. 2 and 3, and provided with knife edges as in Fig. 4. In the working position, these curved portions at least partially encircle the tooth and are advantageously provided with the said knife edges 16. As shown, the knife edges engage a tooth substantially along the base of the cusp 30 of the tooth 12 just above the marginal portions of the gum tissues 26.

Below the grippers 14 are outwardly bowed, depending arms 17 that terminate at their lower portions in suitable clasps or eyelets 18. Projecting inwardly from inwardly-facing recesses defined by the arms 17 are prongs 19, the purpose of which will presently appear, the prongs however being optional, since in many cases these are not needed. In proximity to the floor 20 of the mouth of a patient, are suitably disposed saliva ejection tubes or ejectors 21, these tubes having inlet apertures or ports 22 through which the saliva enters the ejectors. Each ejector is preferably curved upwardly at its forward end as indicated at 23, and attached thereto is a flexible outlet conduit 24, the outlet conduits being preferably made of gum rubber or other material having sanitary properties, and which can be sterilized by boiling. Just above each ejector is a cotton roll 25, suitably positioned to contact the gum tissues 26 on each side of the jaw bone 27 for the purpose of keeping the region in proximity to the tooth, free of saliva, as well as to displace the tongue 28 and cheek 29 for more available working space.

Normally, the clamp 10 in the detached form and under no spring tension, holds the grippers 14 in a retracted position sidewisely, such as is indicated in Fig. 2. In using the device, the operator employs a pair of expansible forceps, not shown in the drawing but well known in the dental profession. Such forceps have depending pins that are engageable in holes 33 of the grippers, so that by expanding the forceps and consequently the grippers also, the operator can place the device in the mouth of a patient in the proper position to engage a desired tooth, and then, by relaxing the forceps, cause the grippers to firmly engage the tooth as shown in Figs. 3, 4 and 5.

While the depending arms 17 can be made integral with the respective grippers 14, it is advantageous to make these arms separate and fasten each one to its respective gripper by means of a rivet 32 or other suitable fastening. Such a fastening can also provide a small amount of movement whereby the gripper is enabled to adjust itself to the tooth configuration.

The compact and unobtrusive properties of the present device in use can be seen in Figs. 3 to 5, it being noticed that the saliva intake tubes 21 are substantially parallel to the cotton rolls 25 and in close proximity thereto. The saliva intake tubes can either be in substantial contact with the floor of the mouth or in suitable proximity thereto, while the relatively small, flexible outlet tubes are draped over the lip 38 with a minimum of discomfort to the patient. The fact that the entire device is fixed prevents any wobble, and makes it possible for the operator to insure its being at all times in the properly placed initial position.

Another noticeable feature is that the saliva inlet tubes have appreciable length along the floor of the mouth making it possible to distribute the inlet perforations over a considerable area of the salivary glands which results in an ample saliva removing capacity.

Between the arch 11 and the forwardly spaced arms 17 is a depressed cradle 31 for accommodating the lower portion of a steel matrix band (not shown) that is usually placed around a prepared cavity for condensing the filling, said lower portion being passed between adjacent teeth as at 39.

The term "cotton roll" is not used in a restricted sense since it means broadly a saliva guard roll.

The slight movement of each gripper around the pivotal rivet 32 in the plane of the gripper is oscillating in character and causes the respective guard roll 25 to adjust along the gum tissue to make close contact therewith.

While the invention has been herein described and illustrated relatively to a specific embodiment, it is limited only by the terms of the following claims.

Having fully described the invention, what is claimed is:

1. A cotton roll holder and saliva ejector for dental use, comprising a spring arch having forwardly extending grippers at opposite sides thereof, adapted to engage a tooth; outwardly bowed arms depending, respectively, from said grippers so as to define cotton-roll-receiving formations; and means at the lower extremities of said arms for supporting respective saliva-ejectors.

2. A cotton roll holder and saliva ejector according to claim 1, wherein said depending arms are pivoted to the grippers so as to have slight oscillating motion substantially in the plane of said grippers.

3. A cotton roll holder and saliva ejector according to claim 1, wherein a portion between said spring arch and said grippers is depressed for the purpose of accommodating the lower portion of a usual tooth filling matrix.

4. A cotton roll holder and saliva ejector, comprising clamp means adapted to be fixed to a tooth in the mouth of a person undergoing dental work; outwardly-bowed holding members depending, respectively, from opposite sides of said clamp means, said holding members having lower holding means adapted to support longitudinally extending saliva-ejector tubes in proximity to the floor of said mouth, and having, further, above the lower holding means, outwardly-bowed holding means adapted to receive and support longitudinally extending cotton rolls above said tubes and adjacent the gum tissues.

5. The combination recited in claim 4 wherein the holding members are pivoted to the clamp means.

6. A dental device, comprising a pair of elongate, perforate, saliva-ejector tubes disposed in side-by-side mutually spaced relationship for placement alongside the gum tissues at opposite sides of the jaw bone in the oral cavity of a person undergoing dental work; holders for elongate cotton rolls disposed immediately above the saliva-ejector tubes and arranged to hold said cotton rolls above and substantially parallel with said tubes; and tooth-gripping means supporting the saliva-ejector tubes and the cotton roll holders in the said relationship.

7. A saliva ejector, comprising an elongate, perforate saliva inlet tube adapted to be disposed alongside the gum tissue in the oral cavity of a person undergoing dental work, and in close proximity to the floor of said cavity; a cotton roll holder disposed above said saliva inlet tube and arranged to hold an elongate cotton roll above and substantially in parallel relationship with said tube; and clamping means to which said tube and said holder are held fixed relative to a given tooth in said oral cavity.

8. A dental device, comprising clamp fastening means operative to be removably fixed to a tooth in the oral cavity; an elongate saliva intake tube supported by said fastening means, so as to have appreciable length along the floor of said oral cavity, said tube being provided with a plurality of perforations spaced along the length thereof, said perforations being adapted to lead from saliva exuding areas of the mouth into said tube; and guard-roll supporting means disposed to hold a guard-roll in substantial paralleling alignment with and above said tube adjacent said gum tissues, said supporting means being pivotally secured to said fastening means and relatively rigidly secured to said intake tube and forming the sole connection between the two.

GEORGE ASHLEY SMITH.

REFERENCES CITED

The following references are of record in the file of this patent:

UNITED STATES PATENTS

| Number | Name | Date |
| --- | --- | --- |
| 730,128 | Jordan | June 2, 1903 |
| 1,742,080 | Jones | Dec. 31, 1929 |